Inventor
ROBERT V. ANDERSON
By H. A. Mackey
Attorney

Inventor
ROBERT V. ANDERSON

By H. A. Mackey
Attorney

Patented Sept. 30, 1952 2,612,554

UNITED STATES PATENT OFFICE 2,612,554

FILM PROJECTOR FOR TELEVISION

Robert V. Anderson, Pleasantville, N. Y., assignor to General Precision Laboratory Incorporated, a corporation of New York Application February 18, 1949, Serial No. 77,100

9 Claims. (Cl. 178—7.2)

This invention relates to a new and improved film projector for transferring the photographic images on a motion picture film to a television system.

Motion picture projectors operate at the rate of 24 individual pictures or frames per second, while television standards currently followed in the United States prescribe transmission at the rate of 30 doubly-scanned video pictures per second, so that some method of reconciling these different rates is necessary in every film television projector. In one method of televising motion picture films alternate frames are projected and televised twice and the remaining frames are projected and televised three times. That is, during the time when a particular frame of film is stationary it is twice televised to form the subject of two television scans, and the succeeding frame is televised three times, forming the subject of three television scans. The process is then repeated with succeeding motion picture frames. This requires the employment of a special motion picture intermittent mechanism having two different lengths of stationary periods, one 50% longer than the other, alternately used.

Another type of special intermittent which has been employed for the same purpose produces a rapid pulldown requiring 60° or less of the 360° comprehended in one cycle of the $\frac{1}{24}$ second duration, and permits conversion from the motion picture frame rate to the television scan rate.

Such an intermittent has, however, never been successfully employed with 35 mm. film because the rapid pulldown injures the film.

In a third method of accomplishing the above result the motion picture film has been moved continuously, and by a complex system of lenses or mirrors the moving film has been televised by a stationary television transmitting tube, the above 3 to 2 ratio of television video pictures to motion picture frames being secured by complex mechanical or electrical means.

All of the above methods require expensive and frequently complicated equipment and the special projectors required are radically different from the standard motion picture projectors in universal use. Likewise all systems heretofore used which use an intermittently moved film restrict the illumination to periods not longer than the television vertical retrace period resulting in only about 7% utilization of the light.

In the present invention a novel arrangement is provided wherein both the light beam projected through the motion picture film and the cathode ray beam are scanned over the mosaic screen of a television transmitting tube. The scanning of the light beam and the cathode ray beam are correlated with respect to each other in a recurring cycle of five television scans and two motion picture frames such that each motion picture frame is scanned 2½ times. This results in an even division of the time periods during which the film is stationary and permits a standard motion picture intermittent to be used rather than necessitating the employment of special devices such as have been required.

Additionally, the conjoint scanning of the light and cathode ray beams in the recurring cyclic relation of the instant invention makes it possible to illuminate the mosaic screen of the television transmitting tube for a greater portion of time, thus permitting the use of lower intensity light sources than have been required in the past. For example, the present invention permits the mosaic screens to be illuminated for approximately 20% of the time as distinguished from the 7% utilization of prior systems.

With the foregoing in mind, it is one of the purposes of the present invention to provide means for televising motion picture film using any standard intermittent having a conventional 90° pulldown of $\frac{1}{24}$ second period.

Another purpose of this invention is to provide simple means for televising motion picture films with improved illumination of the television transmitting tube.

The exact nature of the invention will be more clearly understood from the following description taken in connection with the attached drawing in which—

Figure 1:
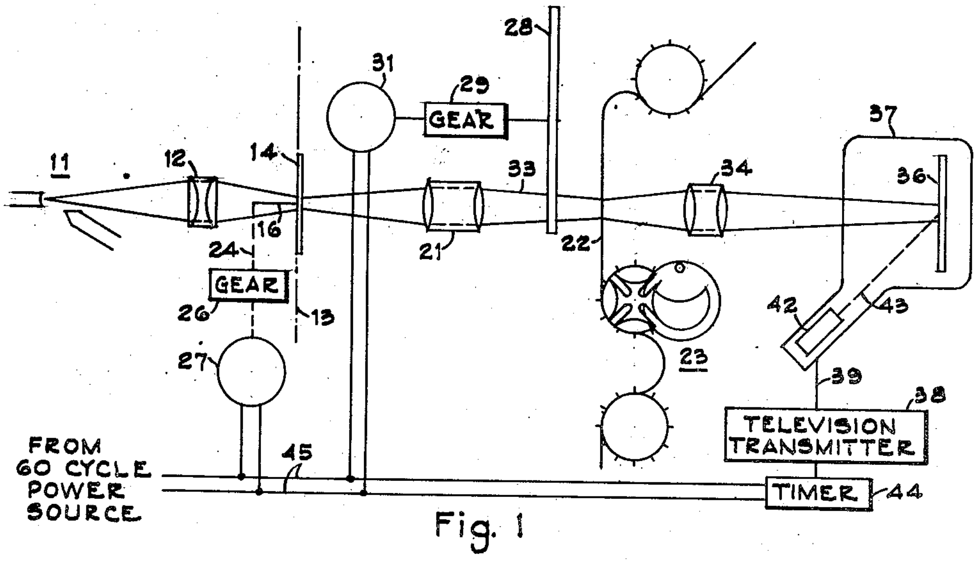
Fig. 1 is a schematic illustration of a system incorporating the instant invention.

Referring now to Fig. 1, a light source 11 emits light which is collected and condensed to uniformly illuminate a restricted area at a plane indicated by the dash-dot line 13. A light scanning disc 14 mounted on a shaft 16 is positioned at this plane and is rotated through the medium of a synchronous motor 27, reduction gearing 26 and shaft 24 connected to the disc shaft 16.

Figure 2:
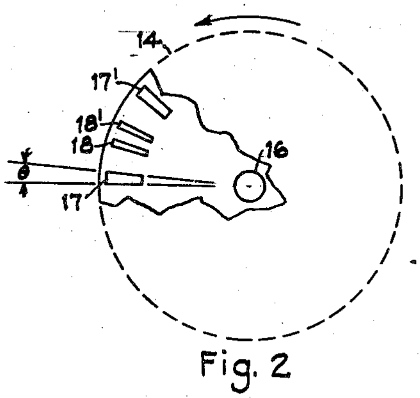
Fig. 2 is an illustration of the portion of the face of a light-scanning disc used in the system of Fig. 1.

The face of the disc 14 as indicated in Fig. 2 is provided with a series of light apertures or slots of different width, six series of four of such slots being used in the form illustrated and each series consisting of a relatively wide light slot 17 followed by narrower light slots 18 and 18' and finally a slot 17' having the same width as the initial slot of the series 17. The disc 14 is rotated in a counterclockwise direction as indicated by the arrow and the reduction gearing 26 is so chosen with respect to the speed of the motor 27 that the disc is rotated at a speed of 120 R. P. M. Thus, during the time of two motion picture frames of $\frac{1}{12}$ of a second, the disc makes $\frac{1}{6}$ revolution and one complete series of the light slots 17, 18, 18' and 17' are swept past the light beam obtained from the source 11.

Such light as is projected through a selected one of these light slots is focused on a motion picture film 22 by a projection lens 21 and the light transmitted through the film strip is in turn focused by a second projection lens 34 on the screen 36 contained within a television transmitting tube 37. This tube is of conventional design and includes an electron gun 42 having the conventional means for vertical and horizontal displacement of the electron beam 43 on the screen 36.

As is well understood in the art the screen 36 comprises a mosaic structure of photosensitive material which at any elemental area thereof is capable of storing a charge that is proportional to the intensity of the light incident thereon and the length of time of the duration of such light.

These elemental areas are successively scanned by the cathode ray beam 43 and the charge accumulated by each area is converted to an electrical quantity which may be transmitted as a television signal. In the usual practice the cathode ray beam 43 is scanned over the mosaic screen 36 at a rate such that the beam moves vertically over the screen in $\frac{1}{60}$ of a second, the horizontal rate of scan being such as to provide 525 interlaced horizontal lines for each two vertical scans. This conventional timing circuit and television transmitter are indicated by rectangles 44 and 38 and the usual connections between these elements and the transmitting tube 37 are depicted by a single conductor 39.

Figure 3:
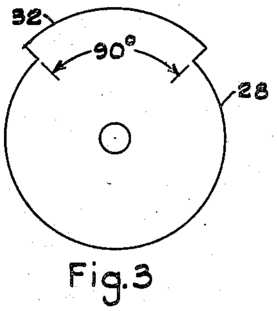
Fig. 3 illustrates a projector shutter used in the invention.
Figure 4:
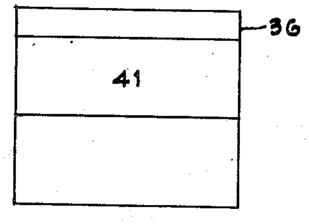
Fig. 4 illustrates schematically the instantaneous position of a light zone on a television transmitting tube screen.

The film strip 22 is intermittently advanced in a downward direction by an intermittent indicated diagrammatically at 23 and a shutter 28 is positioned in the path of the beam of light between the lens 21 and film strip 22. The shutter 28 is rotated by a motor 31 acting through reduction gearing 29 and has a configuration as illustrated in Fig. 3 wherein a fin 32 extends through a circumferential distance of 90°. The shutter 28 is so positioned with respect to the light path that during $\frac{1}{4}$ of its revolution the fin 32 interrupts the light path and prevents any possible light from impinging on the film strip 22 whereas during the remainder of its revolution the light beam is projected past the base radius of the remainder of the shutter 28.

Inasmuch as the shutter 28 is located at a position other than at a focal plane its rotation merely periodically interrupts the light incident on the film strip 22 as is the usual practice. The light scanning disc 14, however, being located at the focal plane of the lens 12 causes an image of the light slots 17, 18, 18' and 17' to be projected on the film strip and advanced upwardly thereof as the disc 14 is rotated. In this fashion the television transmitting tube screen 36 is scanned by the light beam from top to bottom at recurring intervals depending on the relative location of the light slots on the disc 14. Likewise the length of time that light may impinge on any elemenal horizontal line on the screen 36 will depend on the width of the particular slot through which the light is being directed.

Briefly stated, then, the operation of the system is such that not only is the screen 36 scanned by an electron beam 43 in the usual manner, but it is also scanned by a beam of light of finite area whose width is the width of the screen and whose height is less than the height of the screen. At the same time any light which may be projected by a particular light slot in the disc 14 is periodically interrupted by the shutter 28 so that under no circumstances may light reach the film strip 22 and hence the screen 36 while the film 22 is being advanced by the intermittent 23.

Figure 5:
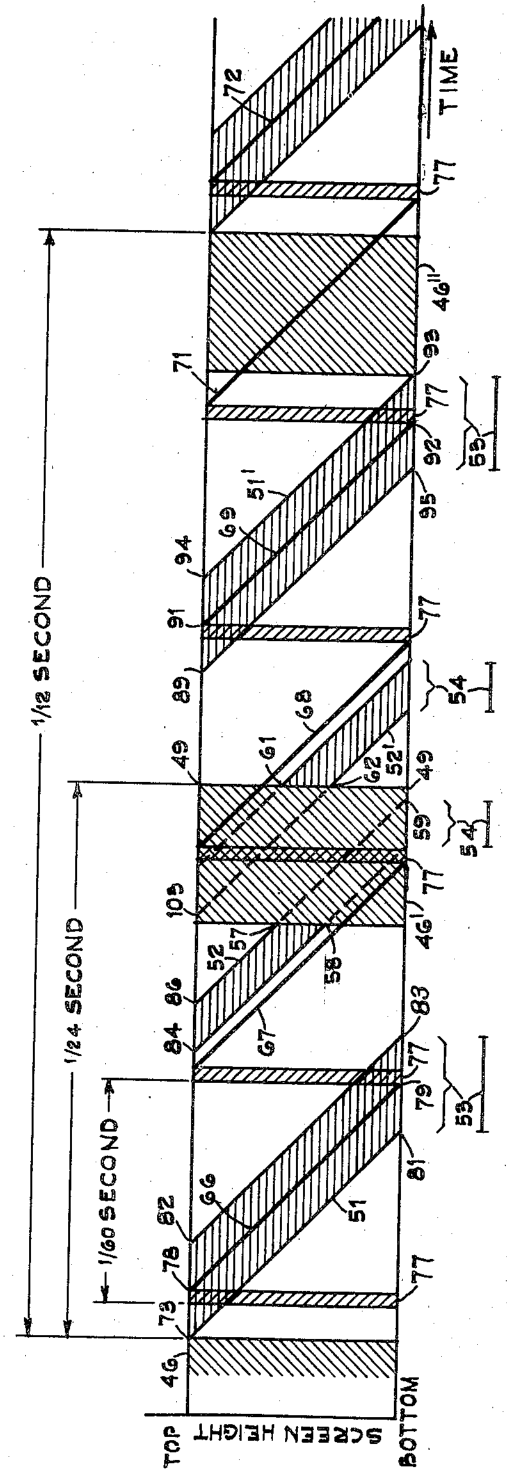
Figs. 5 and 6 are time diagrams used in explaining the scanning relationships.

There must, of course, be a correlation of these actions and the manner in which such correlation is had as well as the nature thereof may be more clearly understood by reference to the timing diaphragm of Fig. 5.

In this diagram the horizontal dimensions constitute the time axis while the vertical dimension is representative of the height of the screen 36. The narrow vertical shaded areas 77 represent the usual television blanking periods during which the electron beam is cut off to permit its vertical return. These occur as indicated at the termination of each vertical scan, namely every $\frac{1}{60}$ of a second, and occupy about 5 to 7% of the available time.

The wide vertical shaded areas 46, 46' and 46'' are representative of the time during which light is prevented from reaching the screen 36 by the action of the shutter 28 and it is during these intervals that the film strip 22 is advanced by the intermittent 23. Thus the shutter 28 interrupts the light beam every $\frac{1}{24}$ second for a period of approximately $\frac{1}{96}$ of a second allowing the film to be advanced each time to the next succeeding frame.

The scanning of the screen by the cathode ray beam 43 is represented by the diagonal lines 66, 67, 68, 69, 71 and 72, each scan beginning at the top of the screen at a time immediately succeeding a blanking period 77 and continuing downward over the screen during a period of $\frac{1}{60}$ of a second reaching the bottom of the screen at a time just prior to the next succeeding blanking period.

As heretofore described the light beam which is uninterrupted by the shutter 28 is also scanned downwardly of the screen by the light scanner 14 and these scans are represented by the diagonal cross hatched areas 51, 52, 52' and 51'. These areas have a width in the horizontal or time direction equivalent to the width of one of the light slots 17, 18, 18' or 17' for the reason that light is projected on any elemental horizontal line of the screen 36 for a time equal to the time interval required for the top edge of a selected light slot to reach the position occupied by the bottom edge when light was first permitted to fall on the elemental horizontal line of the screen. For example, in the case of the light slot 17 this is the time required for the scanning disc 14 to rotate through the angle $\theta$. Thus the areas 51 and 51' produced by the scanning action of the light slots 17 and 17' are wide while the areas 52 and 52' produced by the light slots 18 and 18' are of half this width.

Consider now the correlation of light beam scanning, cathode ray beam scanning and film advance which occurs in one complete cycle of operation which comprises five television scans and two motion picture frames.

At a time indicated by the reference character 73 immediately succeeding operation of the shutter 28 as indicated by the cross hatch area 46, a light slot 17 is in such a position that light projected over its lower edge falls on the top edge of the screen 36. As the light scanner 14 continues to revolve light continues to be impressed on this top edge until a time indicated at 82 when the top edge of the slot 17 is in the position which was occupied by the bottom edge at the time indicated at 73. All during the time interval from 73 to 82 energy is stored in the screen, the amount of which depends on the intensity of the light reaching the screen and length of time that the light impinges thereon.

Ignoring then the varying density of the picture on the film strip 22, the energy stored on the screen 36 at any point is proportional to the horizontal dimension of any area 51, 52, 52' and 51' at that point.

At a time indicated by the point 78, the cathode ray beam 36 begins to scan the screen downwardly as indicated by the diagonal line 66. At this time the light has been allowed to fall on the upper edge of the screen 36 from a time 73 to a time 78 and the cathode ray tube beam converts only this proportion of light energy to electrical energy. The light energy represented by the time 78 to the time 82 being impressed on the screen after the cathode ray beam has passed beyond the top edge of the screen is stored on the screen until removed therefrom by a subsequent cathode ray beam scan. Thus, the first scan by the cathode ray beam converts only that energy represented by the area 73, 78, 79 and 81 and the remaining energy impressed on the screen 36 by the scanning of the light slot 17 and indicated by the area 78, 79, 83, 82 remains stored on the screen.

This stored energy is converted by the next succeeding cathode ray beam scan indicated by the diagonal line 67 and hence the light scanned through the first motion picture frame by action of the first light slot 17 is converted to two television scans.

Immediately after the beginning of the second cathode ray beam scan the second light slot 18 reaches such a position at a time 84 as to begin to scan downwardly over the screen 36. Before the light is completely scanned over the screen by this slot, however, the shutter 28 interrupts further passage of light as indicated by the area 46' and during this period the film is advanced to the next frame.

During this period and just after the shutter 28 interrupts the passage of any light to the screen 36, the slot 18' reaches such a position that if the shutter 28 were not closed a third beam of light would be scanned over the screen as indicated by the dotted lines at time 103. This third scan of light, however, does not reach the screen 36 until after the shutter 28 is opened at a time 49 after the scanning by the light slot 18' has reached a position approximately half-way down the screen as indicated at 61.

Just after what would be the beginning of the light scan by the slot 18' if the shutter 28 were not closed, the cathode ray beam begins its third scan of the screen 36 as indicated by the line 68. Inasmuch as this cathode ray scan follows the partial scans of both the light beams indicated by the areas 52 and 52', the electrical energy derived by such scan represents the energy stored on the screen by these partial light scans, and the energy stored on the screen and converted is representative of the top half of the first motion picture frame and the bottom half of the second.

While as indicated there is some overlap of the energy represented by the light scans 52 and 52' at the center of the screen this overlap does not produce any visible gradation in the television picture as transmitted by the scan 68.

Figure 6:
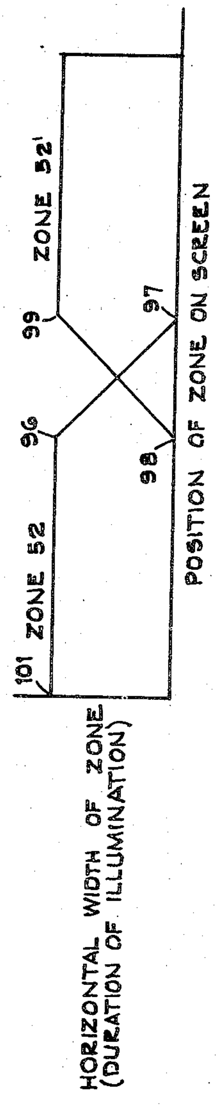

As heretofore stated, the energy is representative of the intensity of the light and its time duration on the screen, namely, the horizontal width of any light zone at any point. Between the points 57 and 58 the horizontal width of the area 52 decreases in the downward direction while at the same vertical distance on the screen between the points 61 and 62 the horizontal width of the area 52' increases. Thus, if the time duration of light on the screen is plotted as in Fig. 6 it is apparent that the intensity of energy due to the light scan 52 is constant between points 101 and 96 and decreases from 96 to 97 while at the same time the energy due to the light scan 52' increases between points 98 and 99 and remains constant thereafter. The energy translated by the cathode ray beam is the sum of these two energies which on adding the two curves will be found to be constant over the whole range, the decrease in energy due to the shortened time of imposition of one light beam on the screen being compensated for by the increase in energy derived from the other.

Subsequent to the third scan by the electron beam the fourth light scan is begun by the light slot 17' at a time indicated at 89.

This light scan is similar to the initial scan of the sequence by the light slot 17 and the cathode ray beam scan 69 follows the beginning of the light scan but occurs before all of the energy represented by the scanning light zone is stored so that only the first portion of the light scan is translated by the fourth cathode ray scan. The remaining portion of the energy, namely, that represented by the area 91, 92, 93, 94 is translated by the fifth and final cathode ray beam scan of the sequence indicated at 71.

It is to be noted that the fourth and final light scan of the sequence terminates at the point 93 just before the second closing of the shutter 28 and that the cathode ray beam scan takes place largely during this period.

Briefly then, the sequence of light and cathode ray scanning is that the first cathode ray scan occurs midway of the first light zone scan, the second cathode ray scan translating the energy represented by the second half of the first light zone. The second cathode ray scan is followed immediately by a second light zone scan whose complete scan is interrupted by closing of the camera shutter and pulldown of the film. This second light scan is followed by a third which occurs after the opening of the shutter and which begins at approximately that point on the screen where the second light scan is terminated through the action of the shutter and pulldown. The third light scan is immediately followed by the third cathode ray beam scan so that the energy translated by this third cathode ray beam scan represents the light from the top portion of one motion picture frame and the bottom portion of the next.

The fourth and final light scan of the cycle is so adjusted in time that its zone extends on both sides of the fourth cathode ray beam scan and the energy translated by the fourth cathode ray beam scan is incorporated only in the first half of the fourth light scan, the energy represented by the last half of this light scan being translated by a fifth and final cathode ray beam scan of the series.

Thus each film frame is scanned approximately two and one-half times in equal division of scanning.

Nothing in the foregoing defines the width of the single-width illumination zones such as depicted between the reference figures 79 and 81 or 84 and 86, but the geometry of Fig. 5 indicates that they cannot be wider than shown, for if they were the zone at reference character 73 would encroach on the projector blanking area 46, or the zone at reference character 93 would likewise encroach, or both would encroach simultaneously, and in any of these cases the requirement for constant time of illumination of all screen elements by each zone is violated. Smaller zones could be employed but a penalty of reduced screen illumination is incurred. It is obvious from the geometry of the graph that in order to employ maximum-width zones, which maximum is approximately 20% of the total time interval, the time relation between the cathode ray scans and the projector blanking must be as shown, so that one electronic blanking time occurs in the exact center of a projector blanking time 46′ once in each $\frac{1}{12}$ second period. This requirement completely defines the necessary phase relation between the electronic scan controlled by the television timer 44, Fig. 1 and the projector shuttering controlled by the projector shutter motor 31. The phase relation between the light scanner and the electronic scanner is defined by the position of the area 73, 78, 79, 81, which must immediately precede the electronic scan 66. The fields of the motors 27 and 31 are each adjustable with reference to the base by rotating it manually around the axis of the motor, therefore by adjusting these motor fields controlling the phases of the light scanner and of the projector shutter the above phase relations are attained.

Departures may be permitted from the positions of some of the zones of light of Fig. 5, without violating these phase requirements. Such changes in position may facilitate the mechanical design and improve the operation by making provision for overcoming the departure of the horizontal electron beam scans from a strictly horizontal position and from constancy of sweep linear velocity. These shifts must, however, preserve the degree of slant depicted in Fig. 5 representing the speed of progression of the zones of light down the face of the screen controlled by the linear velocity of the light scanner. As an example of an allowable departure, zone 78, 82, 83, 79 may be moved to the right to any location between the scan line 66 and the area 46′. Also, the zone 89, 91, 92, 95 may be moved to the left to any location between the area 46′ and the cathode ray scan line 69. The zones 52 and 52′ may also be shifted within the limits of the scan lines 67 and 68. They must be shifted both at once by the same amounts so that the line 57, 58 maintains the same ordinates as the line 61, 62 and the extensions of the zones must remain within the area 46′ and no part may fall outside.

In order that synchronism be maintained between the television scans, the light scans, the shutter and the advancing of the film strip, it is only necessary that all elements be powered from a single source of supply as indicated by the common conductors 45 supplying energy to the motors 27 and 31 and the timer 44.

It will be appreciated that although the light scanner 14, Fig. 1, is described as a disc and illustrated in Fig. 2, with a sample development of the aperture given in Fig. 5, various other known devices may be substituted therefor. For instance, a hollow cylinder, drum or barrel could be employed with apertures circumferentially placed in accordance with a developed aperture layout such as that of Fig. 5 at 53 and 54, or an endless belt containing transverse apertures longitudinally disposed in accordance with an aperture layout may be used.

Fig. 5 illustrates clearly the improvement in illumination secured by this invention. Time elements 77 represent the time allotted for the cathode ray to retrace to the top of the screen and in all previous systems of film television employing intermittents the entire period of excitation of the screen must be confined within this period, which amounts to only from 5% to 7% of the cathode ray vertical scan period, approximately $\frac{1}{1200}$ second. The time permitted for the illumination of any particular element of the screen in the instant invention is the horizontal width of any of the single-width zones, such as for instance the width 84, 86 or 89, 91. This width is several times as great as the width of one of the ray retrace areas 77.

It will also be appreciated that the shutter 28 depicted in Fig. 1 may be placed at any location in the beam of light other than that shown except in a focal plane, and that the positions of the light scanner 14 and of the motion picture film 22 may be interchanged without affecting the operation of the invention.

What is claimed is:

1. In a television system wherein photographic images recorded on a film strip are converted to television signals, a cathode ray tube provided with a light sensitive screen, means for scanning said light sensitive screen with an electron beam, an intermittent mechanism for intermittently advancing said film strip, a light source, means for projecting light derived from said source through said film strip onto said light sensitive screen, said means including light scanning means interposed between said light source and said light sensitive screen provided with apertures through which successive bands of light narrower than the height of said light sensitive screen are caused to traverse said screen at a rate equal to the vertical scanning rate of said cathode ray beam, means for intermittently interrupting the light so projected on said light sensitive screen, means for phasing said light interrupting means and said light scanning means relative to each other so that the light impinging on said light sensitive screen is interrupted during the latter portion of traverse by one of said successive light bands and during the first portion of traverse by the next succeeding light band.

2. A television system as defined in claim 1 wherein said light interrupting means and said intermittent mechanism are so phased that said film strip is advanced during the period that the light is interrupted by said light interrupting means.

3. A television system as defined in claim 2 wherein said light scanning means and said cathode ray beam are so phased that traverse of said light sensitive screen by said one light band immediately succeeds one scan by said cathode ray beam and traverse by said next succeeding light band precedes the next succeeding scan by said cathode ray beam.

4. In a television system wherein photographic images recorded on a film strip are converted to television signals, a cathode ray tube provided with a light sensitive screen, means for scanning said light sensitive screen with an electron beam at a repetition rate of 60 scans per second; an intermittent mechanism for intermittently advancing said film strip at a repetition rate of 24 picture frames per second, a light source, means for projecting light derived from said source through said film strip onto said light sensitive screen, said means including light scanning means interposed between said light source and said screen for causing a series of successive bands of light narrower than the height of said light sensitive screen to traverse said screen at a speed equal to the vertical scanning speed of said cathode ray beam means for intermittently interrupting certain ones of said light bands projected on said light sensitive screen, means for phasing said light interrupting means and said light scanning means relative to each other so that the light impinging on said light sensitive screen is interrupted during the latter portion of traverse by one of said successive light bands and during the first portion of traverse by the next succeeding light band.

5. A television system as defined in claim 4 wherein said light interrupting means and said intermittent mechanism are so phased that said film strip is advanced during the period that the light is interrupted by said light interrupting means.

6. A television system as defined in claim 5 wherein said light scanning means and said cathode ray beam are so phased that traverse of said light sensitive screen by said one light band succeeds a scan by said cathode ray beam and traverse by said next succeeding light band precedes the next succeeding scan by said cathode ray beam.

7. In a television system wherein photographic images recorded on a film strip are converted to television signals, a cathode ray tube provided with a light sensitive screen, means for scanning said light sensitive screen with an electron beam, an intermittent mechanism for intermittently advancing said film strip, a light source, means for projecting light derived from said source through said film strip onto said light sensitive screen said projecting means including light scanning means having at least a series of four apertures so proportioned that bands of light which are narrower than the height of said light sensitive screen are projected thereon in a sequence of four light bands, the first and fourth of said bands in said sequence being approximately twice the width of the remaining bands of said sequence, means for imparting motion to said light scanning means so that successive bands of said sequence are caused to traverse said light sensitive screen at a rate equal to the vertical scanning rate of said cathode ray beam, and means for intermittently interrupting the projection on said light sensitive screen of the latter portion of the second and the first portion of the third of said sequence of light bands.

8. A television system as defined in claim 7 wherein said light interrupting means and said intermittent mechanism are so phased that said film strip is advanced during the period of light interruption by said light interrupting means.

9. A television system as defined in claim 8 wherein the apertures of said light scanning means are so spaced with respect to each other and the motion of said light scanning means is so phased as respects said cathode ray beam that the first and fourth of said sequence of bands is caused to traverse said screen during scan thereof by said cathode ray beam, and the second and third bands of said sequence are caused to traverse said screen during a time interval occurring between successive scans by said cathode ray beam.

ROBERT V. ANDERSON.

REFERENCES CITED

The following references are of record in the file of this patent:

UNITED STATES PATENTS

| Number | Name | Date |
|---|---|---|
| 2,082,093 | Bedford | June 1, 1937 |
| 2,201,069 | Hanns-Heinz-Wolff | May 14, 1940 |
| 2,290,592 | Huffman | July 21, 1942 |
| 2,315,291 | Mattke | Mar. 30, 1943 |

FOREIGN PATENTS

| Number | Country | Date |
|---|---|---|
| 555,773 | Great Britain | Sept. 7, 1943 |